March 30, 1926.  1,578,274
B. E. ELDRED ET AL
METHOD OF TREATING PARTICLES OF MATTER
Filed March 10, 1922  2 Sheets-Sheet 1
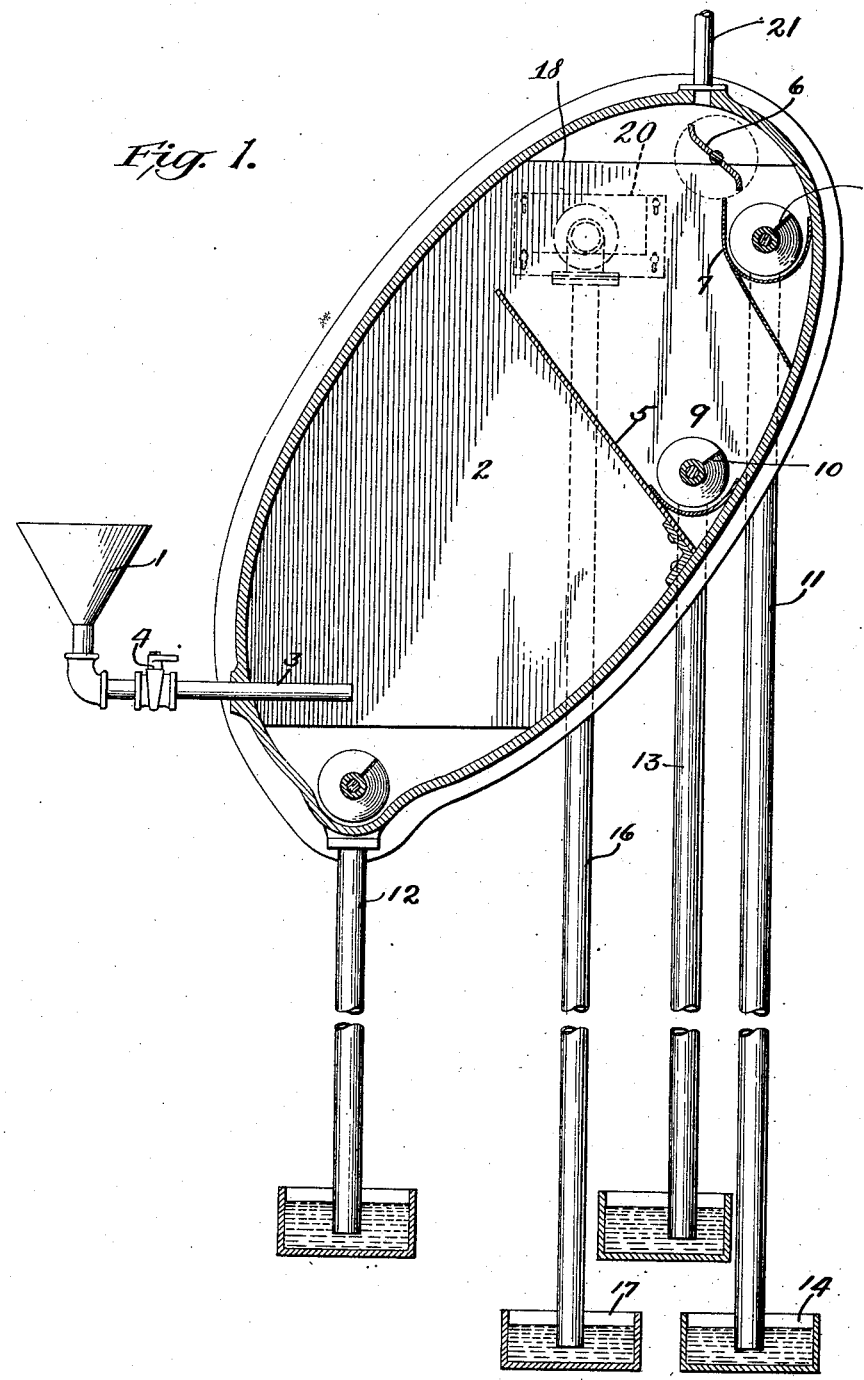

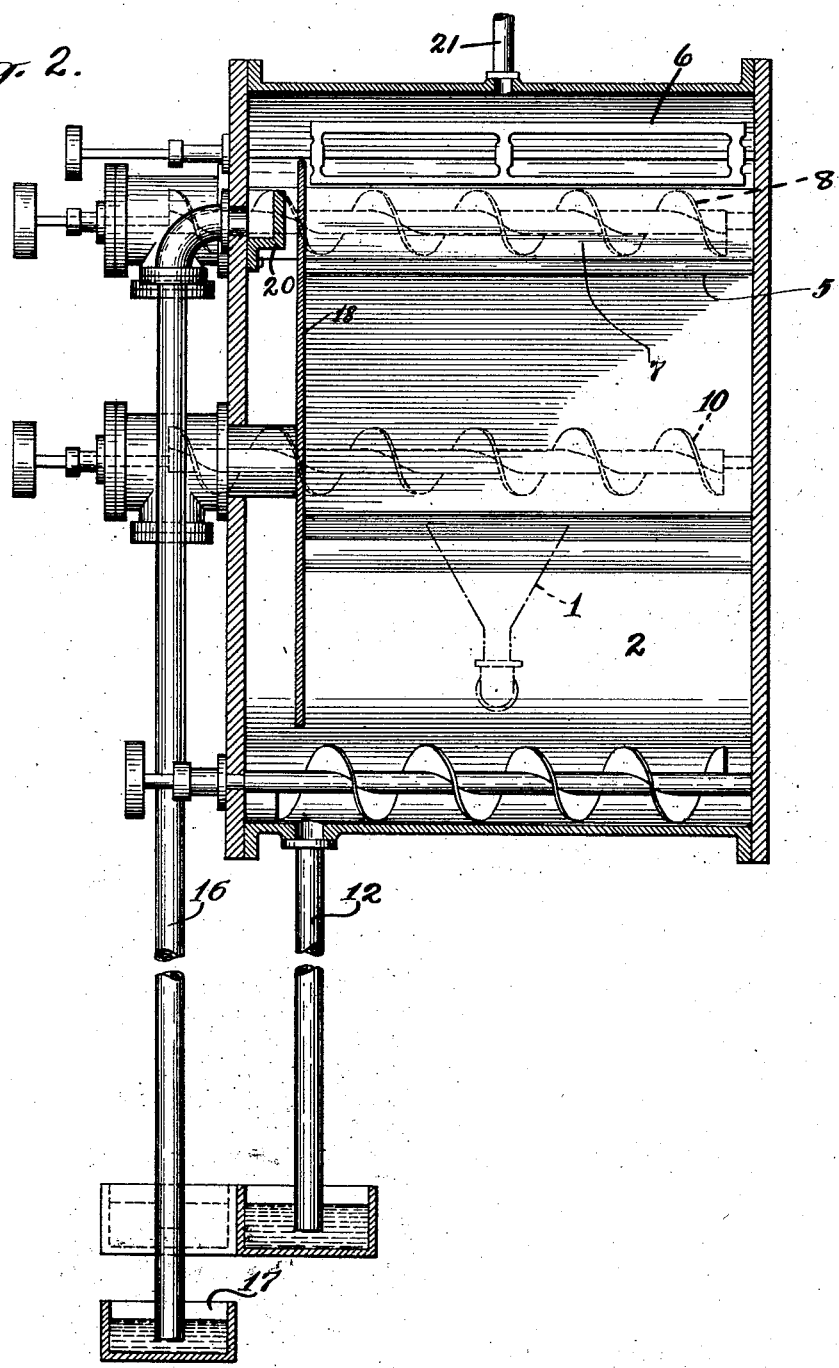

Patented Mar. 30, 1926.

1,578,274

UNITED STATES PATENT OFFICE.

BYRON E. ELDRED, OF GREAT NECK, AND ROBERT N. GRAHAM, OF LONG ISLAND CITY, NEW YORK, ASSIGNORS, BY DIRECT AND MESNE ASSIGNMENTS, TO NATIONAL CARBON COMPANY, INC., A CORPORATION OF NEW YORK.

METHOD OF TREATING PARTICLES OF MATTER.

Application filed March 10, 1922. Serial No. 542,766.

*To all whom it may concern:*

Be it known that we, BYRON E. ELDRED, a citizen of the United States, and ROBERT N. GRAHAM, a citizen of the United States, residing at Great Neck, Long Island, New York, and Long Island City, New York, respectively, have made certain new and useful Improvements in Methods of Treating Particles of Matter, of which the following is a specification.

This invention relates to the recovery of values from mixtures thereof with other materials, and comprises a process whereby a density differential is autogenously established between the values and gangue or waste particles in water or other liquid medium, this differential being sufficient to permit a ready separation by gravity between the particles. The invention comprises also an apparatus whereby the process may be carried into effect.

Our invention utilizes the known property possessed in a high degree by certain kinds of solids and perhaps in some degree by all solids, of condensing and retaining gases upon their surfaces or within their pores, said property being herein termed "adsorptivity". The term "adsorptivity" is used herein to designate that property of matter by virtue of which atmospheric or other gases are condensed upon or within the particles and are held thereby, except as released or partially released by an appropriate opposing force, such for example as a reduction of the total pressure acting upon the particle. Such force is herein designated a "force contra adsorption".

The term "autogenous" is used herein with reference to a change of density of a particle of matter to indicate that such change is brought about wholly or chiefly by the expansion of gas or a gasifiable substance initially adsorbed by the particle and constituting a normal component thereof, in contra-distinction to a change accomplished wholly or chiefly by means of gas bubbles derived from some outside source and attaching themselves to the particle to form an aggregate of lower density than the original particle.

According to our invention we effect an autogenous density change in certain particles, usually those constituting values in the mixture; and thereby establish such degree of density differential between values and non-values as will permit the values to be separated and recovered by simple gravity methods. While our process is believed to be of general applicability to all mixtures whereof one component possesses a materially higher adsorptivity than another or others, we have applied it in the past principally to the concentration or purification of carbonaceous materials such as graphite, coals, lignites and the like; and we will describe the process specifically by reference to the treatment of such materials, it being, however, clearly understood that no limitation is thereby intended. According to our process such carbonaceous materials may be readily purified from slate, earthy matter and other non-carbonaceous substances, which are hereinafter designated "free-ash".

For example, we have taken the rejects from a large coal washing operation which analyzed over 40% ash, of which over 75% was in the form of pyrites, and by the application of our method have quickly and at low cost recovered upward of 90% of the coal content, reducing the ash content to less than 6%.

It is to be understood however, as stated above, that the application of our method is not restricted to the recovery of coal, which material is mentioned merely by way of illustration.

In practising our invention, the separation of the carbonaceous or other adsorptive materials to be recovered from the gangue or other particles to be rejected, is effected by developing in bubble form an in situ on the surface of the particles, gas carried by the adsorptive particles of the mixture, said bubble formation being predominantly developed from adsorbed gas carried by the carbonaceous or other adsorptive material to be separted.

In practising our invention on a mixture of coal and free ash from which it is proposed to separate the coal, we first reduce the mixture to a comminuted condition, to pass 20 mesh, this being ample in most cases to provide a suitable surface to volume relationship for ready flotation. The comminuted mixture is then wetted, preferably with a small amount of water, in genera from 40% to 100% water by volume to form a magma or plastic body, the air in the voids between the particles of the mass being displaced by the water. It will be evident that the finer the material the greater the proportion of water required to form the magma. We find it desirable, especially where mineral sulphides are present, to use water previously freed substantially of dissolved air; likewise it is desirable in the incorporation of the water into the mass of material to avoid the beating in and incorporation of air bubbles, to a detrimental extent, particularly if the magma is to be further treated as is frequently desirable, by the incorporation of an oil before entering the flotation chamber.

The addition of a small amount of oil to the magma we find useful with many coals, especially anthracite, although so far as graphite and some bituminous coals are concerned, little if any apparent benefit is derived by the use of oil. The oil we employ need not be carefully selected, almost any oil of sufficiently low viscosity for ready incorporation serving the purpose, such as any of the well known mineral oils, for example kerosene or fuel oils. We may here mention that the oil used in our process appears to serve a totally different purpose as compared with its usual use in the prior art of flotation. We use the oil for its apparent beneficial effect in more tenaciously holding in place the bubbles developed from the gas carried by the particles beneath the oiled surface and not for its flotative properties nor for the attachment of free bubbles. We do not, moreover, require an oil which has a selective affinity for the surface of one material of the mixture over another as it is immaterial for our purpose if all of the particles be oiled. We also avoid agitation as far as possible at all stages of processing, especially during flotation in order to insure against the detaching of buoying gas bubbles especially where it is desired to discard mineral sulphides from the mass. We find that a particle which has lost its buoying bubbles developed from the gas carried by the particle will sink and be again floated only when sufficient new bubbles have developed upon its surface. Such a sunken particle developing bubbles upon a surface in contact with an oiled particle of sulphide is liable to attach itself thereto and thus likewise float the sulphide particle which is to be rejected; for this reason therefore we provide means in our improved apparatus to move the once floated material out of the path of the rising material and prevent as far as possible its sinking to contact with the gangue material in process of removal from the lower part of the main chamber of the apparatus.

The addition of oil to the mixture causes it to tend to agglomerate. Even without oil the beating in of air bubbles or the formation of same upon the surface of particles of the mixture tends toward agglomeration of contacting particles. We find it most desirable, therefore, to develop the buoying gas bubbles upon the material or materials of the mixture we seek to recover through the development of these bubbles direct from the particles to be so recovered under conditions where there is considerable interspacing of all particles of the mixture at the time such bubbles are generated, thus avoiding the attaching of fine particles of gangue material to those possessing the force of adsorption to a marked degree over the gangue particles.

The mixture after wetting and oiling is entered into a chamber partially filled with water which has been substantially freed of dissolved gas. This water is maintained under a pressure less than the surrounding atmosphere so as to cause the adsorbed gas carried by the particles of the mixture to develop in bubble form and in situ on the surface or surfaces of the particles, the bubble formation on the coal particles predominating due to the fact that these particles possess the power of adsorption to a greater degree than the other particles of the mixture with the result that those particles (coal) are floated free of the other particles of the mixture. We find it desirable to suddenly subject the prepared magma to reduced pressure instead of effecting a gradual change of pressure thereon and find it expedient to admit the material to be treated to the chamber under a pressure above that of the chamber as by so doing the particles of the mixture are dispersed preventing to a satisfactory extent the adhesion of sulphides and gangue to the particles to be separated or mechanical entanglement thereof, allowing these particles to rise free of the gangue material which settles and is removed. We also regulate the introduction of the charge to the chamber so as to preclude the introduction of air to a detrimental extent.

The force of adsorption is such that the adsorbed gas is advantageously not too readily released even under high vacuum. Apparently the wetting with water and the application of reduced pressure each play a part contra that of adsorption and this force we have found is such that if particles which have been floated thereby are substantially wholly freed of their buoyant bubbles and sink they will again develop their adsorbed gas in the form of bubbles and float again, thus alternately floating and sinking several times. We have observed such a repeated performance on the part of some peculiarly shaped particles of coal for example over a period of half an hour.

It is a desideratum of our process to insure flotation of the material by means of gas developed in bubble form from and on the material sought to be recovered by flotation. When preliminary oiling is resorted to for example in the use of the process to free a bituminous coal mixture from mineral sulphides (pyrites) it will be understood that such sulphides do not carry adsorbed gas sufficient to furnish flotation bubbles to effect the flotation of the same, and such sulphides float only by means of attached bubbles derived from a source external to themselves as in the prior art from liberated dissolved gas in the flotation water, beaten in air, or gas derived through chemical means for example by the use of acidulated water. To guard against the flotation of such particles of the mixture as we desire to reject, we not only recommend the practical degasification of the water employed in processing as pointed out above, prior to its use, or the use of such a comparatively small quantity of water in the preparation and feeding of the material to the apparatus employed that dissolved gas will not seriously militate against the results but it will be observed that the methods suggested of feeding intermittently under pressure with the consequent effect of sudden change of pressure upon the freshly entering materials effects in itself what may be termed a classification of the materials of the mixture including the water carrying the same to preclude in a large measure the attachment of any free gas bubbles to the heavier particles, the pyrites, which settle more readily below the zone of generation of bubbles from any gas dissolved or entrained in the water present. As will be observed from the accompanying drawings the design of our apparatus is such that freshly floated material is directed to the surface of the water in the chamber in a contracted zone and it will be evident therefore that any excess volume of free air bubbles derived from leaks in the apparatus or from dissolved gas not previously removed from the water employed will flow to this comparatively restricted zone, causing a surface disturbance which effects the detachment of buoying bubbles from the floated particles in and closely adjacent to this zone. Such particles deprived of attached bubbles sink into a chamber formed by a baffle provided for the purpose, and in this quiet zone containing water incapable of evolving bubbles from dissolved gas under the maintained conditions, the particles of matter capable of supplying their own gas for refloating are again floated to be recovered by removal to a launder, and sulphides or gangue material which may have been primarily floated settle out and are removed by a conveyor. It is desirable that the conveyors shown be selected to provide sufficient capacity for the work required when operating at a very slow speed as it will be evident that the minimum of agitation by these conveyors is desirable.

We do not limit ourselves, therefore, to a single flotation as the quantity of adsorbed gas carried by the particles to be separated and recovered is ample to effect several flotations of these particles so that a clean separation and recovery is assured.

The accompanying drawings illustrate one form of the apparatus of our invention.—

Fig. 1 representing a sectional end elevation; and

Fig. 2 representing a sectional longitudinal elevation.

The prepared material is fed into a feed hopper 1 where sufficient water substantially incapable of generating bubbles to a detrimental extent under subsequent maintained conditions is added to insure a ready flow of the magma. Such water may be supplied and automatically controlled to maintain a liquid seal in the feed hopper thus insuring against an inrush of air. From the hopper 1 the prepared material is fed into a chamber 2 which is under a pressure less than the surrounding atmosphere through pipe 3 intermittently to best advantage by means of a rotary feed valve 4 or other suitable device to provide a sudden change of pressure condition upon the surface of the material. This chamber is partially filled with water substantially incapable of generating bubbles from water-dissolved gases under reduced pressure conditions maintained in this chamber and the adsorbed gas carried by the particles is developed in bubble form on the surface of the particles to cause them to readily float past the baffle 5 to the surface of the water in the chamber, where a paddle device 6 is provided to wipe the surface float into a launder 7 provided with conveyor 8 for the removal of such recovered material. Inasmuch as the bubble formation on the particles to be separated predominates these particles float free of the gangue but such of the particles as do not for any reason float to the surface of the water promptly may fall with the gangue material where they will develop a fresh complement of bubbles and again rise. Such floated material as passes the outer end of baffle 5 and sinks into the chamber 9 will either be again floated and conveyed by removal to launder 7 or be removed by the conveyor 10. Suitable barometric legs for the removal of recovered materials are shown. Such legs are of sufficient height to insure sealing against intake of air and we find it expedient to employ a sufficient added length of leg over that required for sealing purposes in the case of leg 11 used for removal of material discharged from conveyor 8 so that the falling of the discharged material from conveyor 8 shall be employed to knock down preceding material floating upon the surface of the water in leg 11, allowing it to more readily settle to sump 14 out of the influence of the reduced pressure in the chamber 2. The leg 13 is provided for the removal of any gangue which has been floated and thereafter sunk because of the detachment of its buoying bubbles. Legs 12 and 13 are also provided with suitable sumps and any of the usual mechanical devices may be employed for the removal of material from said sumps.

Leg 16 ending in sump 17 is the outlet and overflow from the apparatus to insure constant water level below the lip of launder 7. A water level device is formed by the partition 18 extending above the water level to be carried in the flotation chamber 2 to a point above and near the gangue discharge conveyor to insure against the removal of flotative material. The overflow gate 20 is made adjustable to provide for raising and lowering the working water level in the chamber 2. Leg 16 may advantageously be of extra length over that required to provide a liquid seal thereby providing a reserve space at its upper end which will not be filled with water, serving as a reserve capacity to care for any sudden demands. 21 is a pipe connection for attachment to a vacuum pump (not shown).

While it is preferable to degasify the water or other liquid employed to a practical extent in working our process or at best to exercise care to avoid the entry of air to a detrimental extent to the apparatus when in operation, yet as we have above pointed out, flotation and separation can be effected even if air should leak into the apparatus or if the dissolved gas is not removed from the feed water employed. As the particles to be floated rise in the water in the chamber 2 they are directed to the surface of the water in a contracted zone and any free gas bubbles in the water in the chamber will flow to this zone causing a surface disturbance which tends to effect detachment of buoying bubbles from the floated particles. As the floated particles are traveling to the right as viewed in Fig. 1 after passing the end of the baffle 5, detachment of the bubbles will effect a sinking of the particles out of the path of the following particles and into the quiet zone or chamber 9. This chamber of course is free of any bubbles derived from a source external to the particles themselves, and after the particles settle in this chamber the gas carried by the particles to be recovered will be developed in bubble form on the surfaces of these particles to effect their reflotation and separation from the other particles in the chamber. On this reflotation the particles to be recovered may be removed by the device 6.

The property of adsorption as is evident is diminished by the application of a contra force. Heat in a measure compensates for reduced pressure but we do not find it as economical for practical operation. The power of matter to adsorb gas is increased by pressure and we have floated such matter possessing the property of adsorption without the aid of reduced pressure below that of the atmosphere by first subjecting it both wet and dry to an increased pressure and releasing it under water at normal pressure. Adsorption materials to be treated which have adsorbed a complement of comparatively light gas if placed in water containing heavy readily condensible gas dissolved therein will be caused to give up previously adsorbed lighter gases through the adsorption of the heavier gas dissolved in the water. Such gas expelled by transference forms adherent bubbles.

While flotation may thus be accomplished by several means in the practice of our invention we find it expedient to employ the method described in detail as large capacity at the expense of a very small amount of power attends the operation affording very satisfactory results.

While we wish it understood that our invention relates to the recovery of adsorptive material by the development in bubble form of the gas carried by the material, we do not wish to limit our invention unnecessarily and it is doubtless true that adsorptive materials may likewise absorb gases which would doubtless be the first to form bubbles upon the particles of adsorptive materials. Such bubbles, however, might well not afford sufficient volume to bring about flotation without being supplemented by previously adsorbed gas. We believe that partially removed adsorbed gas forms a more tenaciously holding adherent bubble under the restraining force of adsorption.

It will be seen from the foregoing that our invention is directed to the flotation of particles of matter by developing in bubble form the gas carried by the particles and to the separation of certain particles from a mixture by reason of the fact that the bubbles developed on those particles to be separated predominates over those which may be developed on or attached to the other particles of the mixture.

What is claimed as new is:

1. The process of effecting the flotation of particles of matter in a liquid which process consists in introducing the particles of matter into a liquid which has been substantially degasified and developing in bubble form in situ upon the particles a gas initially carried by the particles so as to effect their flotation in the liquid.

2. The process which consists in substantially degasifying a liquid, introducing particles of matter into the liquid while in this condition and finally subjecting the particles while in the liquid to the action of reduced pressure whereby a gas initially carried by the particles will be developed in adherent bubble form and the desired flotation will be effected substantially wholly by means of these adherent bubbles.

3. The process of separating carbonaceous material from a comminuted mixture containing such material and non-carbonaceous matter, which process consists in effecting a flotation of the carbonaceous material in a liquid and free of the particles of non-carbonaceous matter substantially wholly by means of a gas initially carried by the particles of carbonaceous material and a normal constituent thereof and developed in bubble form upon the carbonaceous particles.

4. The process of separating carbonaceous material from a comminuted mixture containing such material and non-carbonaceous matter, which process consists in wetting the mixture and adding a small amount of oil thereto, introducing the mixture into a chamber partially filled with a liquid and maintained under a pressure below atmospheric to effect a flotation of the carbonaceous material free of the particles of non-carbonaceous matter substantially wholly by means of a gas initially carried by the particles of carbonaceous material and developed in bubble form upon the carbonaceous particles.

5. The process for effecting the separation and recovery of material from a comminuted mixture, which process consists in wetting the mixture and entering the same into a chamber partially filled with a liquid maintained at a pressure requisite to effect a flotation of the material, directing the floating material to a restricted zone in the chamber, sinking the material so floated out of the path of following rising material into a zone in said chamber which is maintained under conditions to substantially prevent the generation of gas bubbles from gas dissolved in the liquid, and then effecting a reflotation of the material to be separated and removing the material refloated.

6. The process for effecting the separation and recovery of highly adsorptive material from a comminuted mixture, which process consists in wetting the mixture, entering the mixture into a chamber partially filled with a liquid, effecting a flotation of the highly adsorptive material to a restricted zone at the surface of the liquid, sinking the material thus floated into a zone out of the path of following rising material and while maintaining conditions in said zone to substantially prevent the generation of gas bubbles from dissolved gas held in the liquid in said zone, effecting a reflotation of the highly adsorptive material by developing in adherent bubble form the adsorbed gas carried by the material to be refloated, and finally removing the refloated highly adsorptive material.

7. The process for effecting the separation and recovery of material from a comminuted mixture containing the same, which process consists in subjecting the mixture to a vacuum while immersed in a liquid in a chamber to effect the flotation of the highly adsorptive particles of the mixture, directing the rising particles to a restricted zone in said chamber, sinking the particles so floated into a zone in said chamber which is also under a vacuum the sinking particles traveling out of the path of following rising material, then developing in bubble form by the application of vacuum a gas carried by the particles so sunk to effect a reflotation of the particles to be separated, to permit of their recovery at the surface of the liquid in the chamber.

This specification signed this 23rd day of February 1922.

BYRON E. ELDRED.
ROBERT N. GRAHAM.